United States Patent [19]

Pietrenka

[11] 4,202,126
[45] May 13, 1980

[54] FISH STRIKE DETECTING APPARATUS

[76] Inventor: Edward Pietrenka, 315 S. Park, Westmont, Ill. 60559

[21] Appl. No.: 943,997

[22] Filed: Sep. 20, 1978

[51] Int. Cl.² ............................................. A01K 97/12
[52] U.S. Cl. ......................................................... 43/17
[58] Field of Search ...................................... 43/16, 17

[56] References Cited

U.S. PATENT DOCUMENTS

| 2,560,905 | 7/1951 | Teel | 43/17 |
| 3,134,187 | 5/1964 | Blakely | 43/17 |
| 3,702,513 | 11/1972 | Watts | 43/17 |
| 4,006,550 | 2/1977 | Rizzo | 43/17 |

Primary Examiner—James G. Smith

Attorney, Agent, or Firm—Leydig, Voit, Osann, Mayer & Holt, Ltd.

[57] ABSTRACT

A detecting apparatus that is mountable remote from a fishing rod for monitoring fish strikes. The detecting apparatus includes a rod and line engaging means that is attachable to a portion of the fishing line or rod that experiences movement upon a fish strike. Coupled to the engager means is an insulator which is normally positioned between contact pieces of an electrical indicator circuit, but is pulled from between the contact pieces to energize the circuit in response to movement of the engager means when the fishing line is struck. Upon a fish strike, the engager means further completely disengages from the fishing line or rod, permitting the rod to be used without the hindrance of the strike detector apparatus.

15 Claims, 5 Drawing Figures

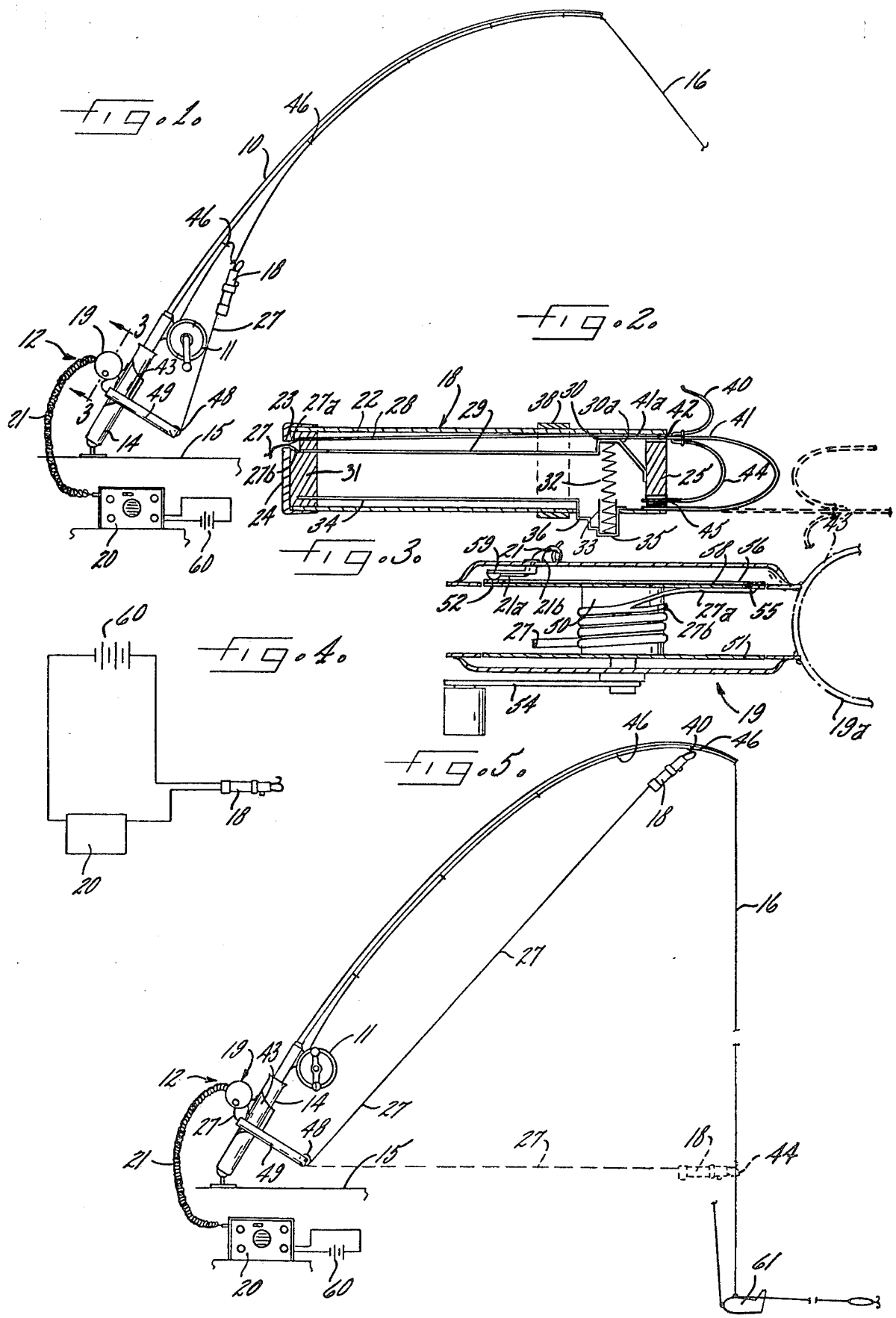

4,202,126

FISH STRIKE DETECTING APPARATUS

DESCRIPTION OF THE INVENTION

The present invention relates to fish strike detecting devices for fishing rods.

Various devices have heretofore been proposed for detecting when a fish has struck the hook of a fishing line and automatically providing an output indication, such as activation of a light. In general, these prior devices have been directly mountable on the fishing rod and position the fishing line between a pair of spring biased contact members of the device. When a fish strikes the line, the force exerted on the line causes the line to be pulled from between the contact pieces, permitting the contact members to come into contact and close an electrical circuit that energizes the signalling device.

Such prior bite detector devices have had various drawbacks. First, since the line is repeatedly disposed between the spring biased contact pieces, the line has a tendency to become frayed, damaged, or otherwise weakened. This is particularly the case with lightweight mono filament fishing lines commonly used today. Furthermore, such devices are not usable when metal lines are employed since such line would short the contacts. Moreover, because such detector devices generally are mounted directly on the rod in close proximity to the reel, the line sometimes becomes entangled in the detecting device after its initial release upon a strike. With the detector device mounted on the rod in such manner, the rod and reel also become more cumbersome to handle during casting or reeling.

It is the object of the present invention to provide a fish strike detecting device which does not require that the line be used as the insulator to separate contact pieces thereof.

Another object is to provide such a fish bite detecting device which will automatically provide an output signal upon a fish strike, but which enables the rod and reel to be utilized during casting and reeling without cumbersome attachments thereon.

A related object is to provide a fish bite detecting device as characterized that is removably mountable remotely from the rod and reel assembly and thereby eliminates entanglement of the fishing line and the rod with the detector device upon a fish strike and upon reeling of the line.

Still another object is to provide a fish bite detecting device of the foregoing type that can be readily attached to the fishing line.

Yet another object is to provide a fish bite detecting device of the above kind that is particularily useful for trolling, and may be easily adapted for both flat line or down rigger trolling arrangement.

Other objects and advantages of the invention will become apparent upon reading the following detailed description and upon reference to the drawings, in which:

FIG. 1 is a side elevation view of a fishing rod and reel mounted in a boat pole holder in a flat line trolling condition and equipped with a fish strike detecting apparatus embodying the present invention;

FIG. 2 is an enlarged section of the line and rod engager of the detecting apparatus shown in FIG. 1;

FIG. 3 is an enlarged fragmentary section of the reel of the illustrated detector apparatus taken in the plane of line 3—3 in FIG. 1;

FIG. 4 is an electrical diagram of the illustrated detector apparatus; and

FIG. 5 is a side elevation view of the rod and detector apparatus shown in FIG. 1, with the line in a down rigger trolling arrangement.

While the invention is susceptible of various modifications and alternative constructions, certain illustrative embodiments thereof have been shown in the drawings and will be described below in detail. It should be understood, however, that there is no intention to limit the invention to the specific forms disclosed, but, on the contrary, the intention is to cover all modifications, alternative constructions, and equivalents falling within the spirit and scope of the invention.

Turning now more particularly to FIG. 1 of the drawings, there is shown a conventional fishing rod 10 and reel 11 equipped with fish line detecting apparatus 12 embodying the present invention. The rod 10 in this case is removably supported in a conventional rod holder 14 which typically is mounted on a boat deck 15. Extending from the rod and reel is a fishing line 16, which in the embodiment of FIG. 1, is rigged for flat line trolling such that the bait travels at a relatively shallow depth as the boat moves.

In accordance with one aspect of the invention, the fish bite detecting apparatus is removably mounted remote from the pole so as to permit unencumbered casting and reeling without entanglement of the line or rod with the detector apparatus. The illustrated detector apparatus includes a line and rod engager 18, which in the embodiment of FIG. 1 is removably attached to the fishing line 16, a reel 19 removably mounted on the rod holder 14 for permitting selective taut attachment of the engager 18 on the line 16 or rod 10, and an indicator 20, such as a horn or lamp, electrically coupled to the engager through the reel 19 and a cable 21.

The illustrated line and rod engager 18, as best shown in FIG. 2, comprises a hollow insulating housing 22 having an end closure cap 24 at one end and a support guide plate 25 at the opposite end, with two relatively movable contact pieces 28,29 supported within the housing. The contact piece 28 is a straight member fixed adjacent an inside wall of the housing, and the opposed contact piece 29 has an outer end formed with an electrical contact and spring retainer section 30 and a guide ramp 30a which is transversely movable relative to the housing 22 and the fixed contact piece 28. The inner ends of the contact pieces 28,29 are positioned within separate folds of an insulator 31 so as to prevent electrical contact and hold contacts 28 and 29 in relation to each other. An electrical conduit 27 comprising a pair of wires 27a, 27b, is coupled to the contacts 28,29 and extends out through an aperture 23 in the housing closure plate 24.

For biasing the movable contact piece 29 in a direction toward the stationary contact piece 28, a transverse biasing spring 32 is interposed between the contact section 30 of the contact piece 29 and a reaction plate 34 disposed adjacent the side of the housing opposite the fixed contact 28. The reaction plate 34 is formed with an outwardly extending channel 35 at one end for receiving an insulatory cup 33 in which the biasing spring 32 is held. The opposite end of the plate 34 is positioned in the insulator 31 so as to be insulated from the contact pieces 28, 29. To permit selective adjustment of the biasing force of the movable contact piece 29, the reaction member 34 is formed with a series of steps 36 leading to the channel 35 and a sleeve 38 is slidably disposed about the housing 22. The biasing force of the spring may be adjusted by manually forcing the protruding channel 35 of the reaction plate 34 into the housing until a selected one of the steps 36 is aligned with the housing wall and then moving the sleeve 38 over that step to secure the reaction plate in such position.

In keeping with the invention, the rod and line engager 18 includes a hook 40 that is selectively attachable to that portion of the rod or fishing line which will experience significant movement upon a fish strike and coupled to the hook is an insulator piece for normal positioning between the contact pieces of the engager, but which is pulled from between the contact pieces in response to the movement of the engager hook 40. The hook 40 in this instance is fixed to an elongated flexible looped plastic strip 41 having one end fixed to the housing support plate 25 and the other end 41a removably positioned between the contacts 28,29. The support plate 25 is formed with an aperture 42 through which an end 41a of the plastic piece is guided when placing it into the contact separating position. In those instances where it is desirable to captively retain the fishing line 16, a second hook 44 is provided having a free end which enters a second aperture 45 in the support plate 25. In the embodiment of FIG. 1, the engager 18 is attached to the fishing line 16 by placing the hook 40 over a drawn back portion of the line, that has been pulled from between two eyelets 46 of the rod. The aperture 23 for the conduit 27 is located on the same side of the housing as the hook 40 so that when the engager is attached to the rod or line its center of gravity tends to cause the engager to hang downwardly from the line, as shown in FIG. 1, so as to eliminate the possibility of twisting of the line 16.

For maintaining the engager 18 in taut and clear engagement with the fishing line 16, the engager conduit 27 is connected to the reel 19. The reel 19 in this case is removably mounted on the rod holder 14 by a clamp 43 and the conduit 27 from the engager 18 is trained about a positioning roller 48 at the end of an extension member 49 mounted adjacent the reel 19 in perpendicular relation to the rod holder.

The reel 19, as best shown in FIG. 3, may be of a conventional type that is adapted to permit the conduit to be selectively trained out a desired length and then either locked, or set with sufficient drag, as to remain taut and prevent further extension of the conduit under engaged conditions. The illustrated reel includes a spool 50 having side plates 51, 52 which is rotatable by a handle 54. The reel 19 in this case is further adapted to electrically couple the engager conduit 27 with the indicator means conduit 21. One lead wire 27b of the conduit 27 is connected to the spool 50, which in turn is connected to ground through the reel body. The other lead wire 27a of the conduit 27 is connected to a positive terminal 55 on the spool side 52. The positive terminal 55 is connected to a conductive circular plate 56 which is insulated from the spool side 52 by an insulating spacer 58. The positive lead wire for the indicator cable 21 is connected to the conductive plate 56, which rotates with the spool 50, by the stationary brush connection 59.

The indicator 20, which may be a horn, light, or similar electrical device, is connected to a suitable DC power supply 60, which may be in the boat or self contained, to complete the electrical circuit diagramatically illustrated in FIG. 4. It can be seen that the indicator 20 will be energized by the DC power supply 60 when the rod and line engager contacts 28, 29 are closed upon removal of the insulator strip end 41a.

The fish strike detecting apparatus of the present invention is particularily useful for trolling, and may be easily adapted for both flat line or down rigger arrangements. In the embodiment shown in FIG. 1, the detecting apparatus is shown in use during a typical flat line trolling arrangement. The fishing line 16 is pulled back to form a loop between two eyelets on the pole and the hook 40 of the line and rod engager 18 is attached to the line at that point. The reel 19 of the detector apparatus draws the engager into a taut or firm engagement with the fishing line 16, and the arm 49 holds it clear of the rod 10 and reel 11. The line 16 in turn also is taut because of the pressure exerted on the line 16 by the bait being pulled through the water by the slowly moving boat.

In the event that a fish strikes the line, the force will cause the loop in the fishing line to straighten pulling the hook 40 outwardly from the engager housing 22, which in turn pulls the end 41a of the plastic contact strip 41 from between the contacts 28, 29 allowing the contacts to close the electrical circuit shown in FIG. 4, thereby energizing the strike indicator 20. Moreover, when the end 41a of the plastic strip 41 is freed from the clamping force of the contact pieces 28, 29 the plastic strip 41a will be pulled out of the guide plate 25 unfolding to the position shown in phantom in FIG. 2, completely releasing the hook 40 from the line 16. With the rod and line engager 18 so released, and since the reel 19 and indicator 20 are mounted remote from the fishing rod 10, upon energization of the strike indicator, the fisherman may thereupon remove the rod 10 from the rod holder 14, play the fish, rebait, and cast, without hindrance or interference from the strike detecting apparatus.

Referring now to FIG. 5, the fishing rod 10 and strike detecting apparatus 12 shown in FIG. 1 are shown with the fishing line in a down rigger arrangement. The line 16 is attached in a conventional manner to a down rigger 61, which causes the bait to travel at a relatively deep depth. In such condition, the line 16 extends nearly vertically into the water, and the pressure exerted on line 16 by attachment to the down rigger 61 causes the end of the pole to bend substantially. The hook 40 of the engager 18, therefore, may be attached to an eyelet 46 in the bent portion of the pole 10, and the reel 19 again draws the engager conduit 27 into a taut condition. and the arm 49 holds it clear of the fishing rod and reel. When a fish strikes the line 16, the force of the strike will cause the line to release from the down rigger 61, thereupon at least initially causing the pole to return to a straightened condition. This movement has the effect of again pulling the engager hook 40 and insulator strip 41a out from the guide plate 25 causing closure of the contacts 28,29 and energizing of the strike indicator 20.

Alternatively for down rigger arrangements, the engager 18 could be secured to the line as shown in phantom in FIG. 5. In such case, to assure that the engager maintains engagement with the line 16, it is preferable to secure the line 16 within the hook 44, the end of which is positionable in the support plate aperture 45 of the guide plate 25 to captively retain the line when the insulator strip 41a is positioned between the contacts 28, 29. In such condition, when a strike occurs, the fishing line 16 will detach from the down rigger 61 and will move outwardly from the pole, again causing movement of the hook 44 and insulator strip end 41a from the guide plate 25 and activation of the indicator 20.

From the foregoing, it can be seen that the fish strike detecting apparatus of the present invention does not require that the fishing line act as an insulator to separate contacts of the electrical indicator circuit, and thus does not have the effect of fraying, damaging or otherwise weakening the line as heretofore could occur with previous detector devices. It can further be seen that not only is the detector apparatus removably mounted remote from the fishing rod, but that the line and rod engager completely disengages from the line upon a strike so that the rod may be handled without hindrance by the detecting apparatus.

I claim as my invention:

1. A strike detecting apparatus for use with a fishing rod and line assembly comprising means for engaging a portion of said fishing rod and line assembly that experiences movement upon a fish striking the line thereof, means for supporting a pair of relatively movable contact pieces, biasing means for urging said contact pieces toward each other to close said contacts, insulator means coupled to said engaging means for removable placement between said contact pieces, electrical indicator means, an electrical energizing circuit including a source of electrical energy coupled between said indicator means and said contact pieces, and said insulator means being removable from between said contact pieces in response to movement of said line and pole engaging means upon a strike of said fishing line to permit closure of said contact pieces and energizature of said electrical indicator means.

2. The strike detecting apparatus of claim 1 including means for adjusting the force by which the biasing means urges said contact pieces together.

3. The strike detecting apparatus of claim 2 in which said support means for said contact pieces is a non-conductive hollow housing, and said biasing means is a spring contained within said housing.

4. The strike detecting apparatus of claim 1 in which at least one of said contact pieces is formed with an angled-end portion for guiding said insulator means into position separating said contact pieces.

5. The strike detecting apparatus of claim 3 in which said adjusting means for said biasing means includes a reaction member mounted within said housing for transverse movement relative to said housing, said reaction member being formed with a stepped protruding portion extending outwardly from said housing, said biasing spring being interposed between said reaction member and one of said contact pieces, said reaction member being movable transversely to said housing to selectively align one of the steps of said protruding portion with said housing to establish a desired biasing force, and means for retaining said reaction member in said selected position.

6. The strike detecting apparatus of claim 1 in which said support means for said contact pieces is a non-conductive hollow housing, said rod and line assembly engaging means includes a hook for engaging said line assembly, and flexible means attaching said hook to said housing for permitting movement of said hook with said line relative to said housing upon a fish strike.

7. A strike detecting apparatus of claim 6 in which said engaging means is disengageable from said line upon a strike following removal of said insulator from between said contacts.

8. The strike detecting apparatus of claim 6 including means cooperating with said hook for captively engaging said line when said insulator is in said contact separating position.

9. The strike detecting apparatus of claim 7 in which said contacts are supported in said non-conductive housing, and said housing is formed with an aperture for receiving a free end of said hook once said hook is in an engaging position.

10. The strike detecting apparatus of claim 1 including means for maintaining said engaging means at taut engagement with said line and rod assembly portion to which it is attached prior to a fish strike.

11. The strike detecting apparatus of claim 10 in which said means for maintaining said engaging means in taut engagement includes a reel, and a cable connecting said reel to said engaging means.

12. The strike detecting apparatus of claim 11 including means extending outwardly from said reel for training said cable in a path spaced outwardly from said rod.

13. The strike detecting apparatus of claim 11 in which said rod is removably positionable in a rod holder, means releasably supporting said reel on said rod holder, and an arm extending outwardly from said reel supporting means for training said cable outwardly from said rod.

14. The strike detecting apparatus of claim 11 including means for electrically coupling said contact pieces to said indicator means through said reel.

15. The strike detecting apparatus of claim 14 in which said rod is removably positionable in a rod holder, said reel and indicator means being removably mounted remote from said rod, and said engaging means being disengageable from said line and rod assembly upon a strike of said line whereby said rod may be removed from said rod holder upon a strike for handling without the hindrance of said detecting apparatus.

* * * * *